United States Patent [19]
Yao et al.

[11] Patent Number: 5,789,518
[45] Date of Patent: Aug. 4, 1998

[54] METHOD FOR AQUEOUS POLYURETHANE BLOCKING REACTION

[75] Inventors: Shin-Chuan Yao; Jongfu Wu; Kun-Lin Cheng; Wen-Tung Chen; Fu-Fong Chang, all of Taipei Hsien, Taiwan

[73] Assignee: China Textile Institute, Taipei, Taiwan

[21] Appl. No.: 649,025

[22] Filed: May 16, 1996

[51] Int. Cl.[6] .................................................. C08G 18/80
[52] U.S. Cl. ........................... 528/45; 528/71; 252/182.2; 252/182.22; 524/591
[58] Field of Search ............... 528/45, 71; 252/182.2, 252/182.22; 524/591

[56] References Cited

U.S. PATENT DOCUMENTS 5,508,370 4/1996 Reiff et al. .................................. 528/45
5,583,176 12/1996 Haberle ..................................... 524/591

*Primary Examiner*—Rachel Gorr
*Attorney, Agent, or Firm*—Morton J. Rosenberg; David I. Klein; Jun Y. Lee

[57] ABSTRACT

An improved method of reaction of water PU resins for improving the blocking reactions of beta-dicarbynal compounds and polisocynantes, and reducing the reaction time for water PU blocking, wherein the construction is:

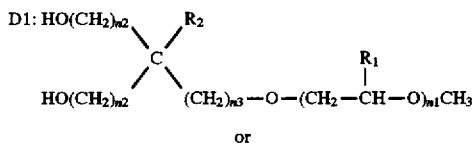

or

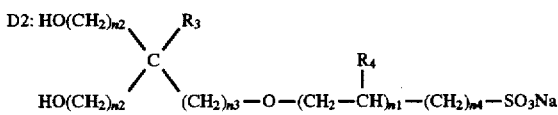

wherein:

$R_1, R_2, R_3, R_4$ = hydrogen or alkyl group $n_1 = 1 \sim 100$ $n_2, n_3, n_4 = 1 \sim 10$ The blocking agents of beta-Dicarbonyl compounds are reduced by $D_1$ and $D_2$ which are used in the blocking reactions of water PU.

6 Claims, 1 Drawing Sheet

METHOD FOR AQUEOUS POLYURETHANE BLOCKING REACTION

BACKGROUND OF THE INVENTION

1. Field of the Invention

The present invention involves the use of an additional substance in the blocking reaction between beta-dicarbonyl compounds and polyisocyanates in order to reduce the reaction time and avoid side reactions.

2. Description of the Prior Art

The object of the blocking agent is to prevent the diisocyanates from chemically reacting with the reactive substance. If necessary, the blocked diisocyanates may be heated so that the active isocyanates may be involved in the required reaction.

There are three disadvantages for using the high temperature blocking agents such as ε-caprolactam:

1. The high temperature causes yellowing of the polyurethane (PU) components.

2. When applying to the fabric, this will induce the yellowing of the fabric.

3. Higher power consumption is required.

Based on the reasons described above, U.S. Pat. Nos. 4,007,215 and 4,101,530 and German Patents #2612783 and #2612785 disclose the use of beta-dicarbonyl compounds such as malonic ester, acetoacetic acid alkyl ester and acetylacetone to perform the blocking reaction is isocyanates using the temperature of reaction to the range of 140° C.–150° C.

Generally, when blocking agents like beta-dicarbonyl compounds are reacted with isocyanates, the reaction time is greater than eight hours and the reactions are not complete. The addition of alcohols is required for blocking the remaining isocyanate groups, such as that described in the British Patent #2,212,169. Such treating process not only uses more power, it also easily induces side reactions.

SUMMARY OF THE INVENTION

Therefore, the object of the present invention is to provide an improved method for the aqueous polyurethane (PU) blocking reaction.

That is, the object of the present invention is to improve the reaction time of the reaction between beta-dicarbonyl compounds and isocyanates. In the present invention, prior to the forming of the PU polymer, the following substances are added so that the reaction time is decreased to 1–3 hours:

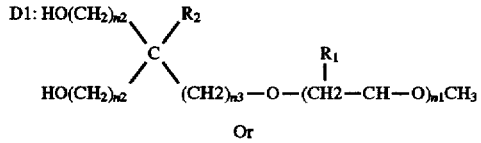

Or

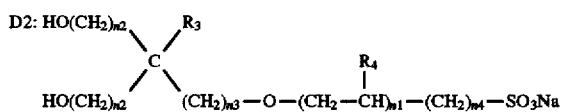

wherein:

$R_1$, $R_2$, $R_3$, $R_4$ = hydrogen or alkyl group
$n_1 = 1-100$
$n_2$, $n_3$, $n_4 = 1-10$ The blocking agents of beta-Dicarbonyl compound for matching with $D_1$ and $D_2$ are: a) malonic ester, such as diethyl malonate; b) acetoacetic acid alkyl ester, such as acetoacetic acid ethyl ester, and c) acetylacetone.

The reaction temperatures of said reactions are generally between 20° C. and 150° C., and the reactions are performed with the alkali catalyst, ex. diazabicyclooctane, triethylamine, sodium methoxide, sodium ethoxide, sodium phenolate, etc.

The NCO/OH ratio in the present invention is within the range of 1.0–2.0, wherein the portion of the polyol comprises the group of polyester polyol, polycarbonate polyol, polyether polyol, and the mixed polyol combined from those described above, such as: polytetramethylene glycol (PTMG); polypropylene glycol (PPG); polyethylene glycol (PEG); polyethylene adipate; and polybutylene adipate.

Isocyanates used in the present invention are aromatic compounds, aliphatic compounds, and alicyclic compounds, for example: 4,4'-dicyclohexylmethane diisocyanate $H_{12}MDI$; isophorone diisocyanate (IPDI); 1,6-hexamethylene diisocyanate (HDI); diphenyl methane 4'4-diisocyanate (MDI); toluylene diisocyante (TDI); p-xylene diisocyanate (XDI); and, meta-tetramethylxylylene diisocyanate (TMXDI).

The improved method of blocking reaction of beta-dicarbonyl compounds in the present invention is adapted to use in the reaction of aqueous PU resins, for example, cationic, anionic and nonionic aqueous PU resins, thus the processing period of blocking type water dispersion PU resin is reduced. The embodiments of the present invention are described in the following:

DESCRIPTION OF THE PREFERRED EMBODIMENTS

Figure 1:
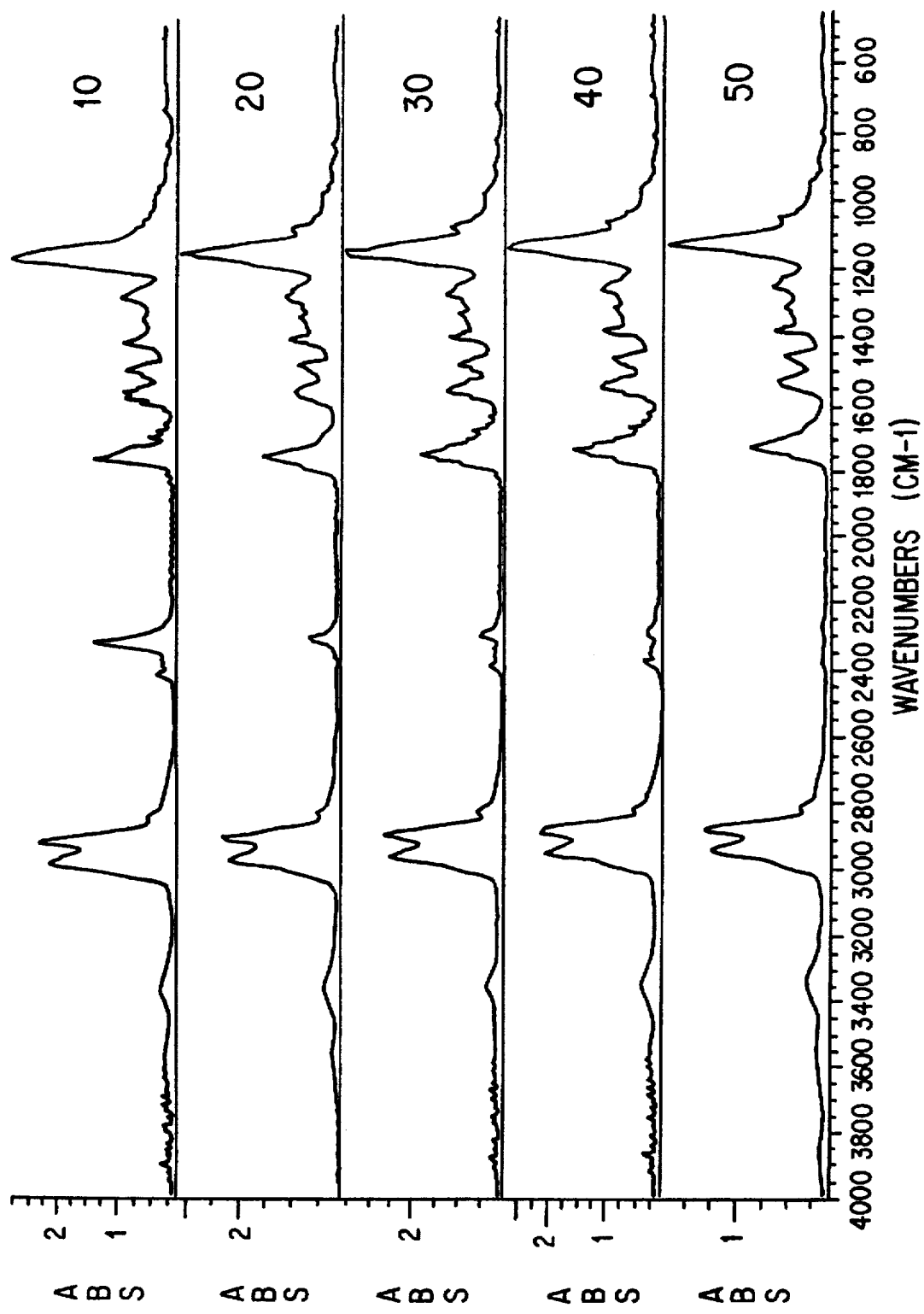
FIG. 1 is a graphical representation of the IR spectrum of the reaction mixture before the reaction is initiated and at various blocking times.

Referring to FIG. 1, such is a graphical representation of the IR spectrum with the condition of the prepolymer shown at 10. The IR spectrum after a blocking time of thirty minutes is represented by the area designated 20. The IR spectrum after one hour is shown at 30. The IR spectrum after 1.5 hours and 2.0 hours is represented respectively by element numbers 40 and 50.

EXAMPLE 1

(A) Nonionic water dispersion PU

The following ingredients are added to a reactor:

50 grams of polytetramethylene glycol (PTMG, the average molecule weight is 2000)

10 grams of polypropylene glycol (PPG, the average molecule weight is 6000)

20 grams of D1

(Wherein $R_1=R_4=H$, $R_2=R_3=CH_2CH_3$, $n_1=30$, $n_2=n_3=1$), and nitrogen is added, then agitated for 10 minutes under 80° C., next adding 25.8 grams of 4,4'-dicyclohexylmethane diisocyanate ($H_{12}MDI$) to react under the same temperature for eight hours. Next, 14.4 gram of diethyl malonate is added for performing the blocking reaction for two hours. Then from the spectrum of the infrared, we can see that the N=C=O absorption at 2270 cm$^{-1}$ has disappeared completely. Thus the blocking reaction is certainly completed. Finally, 500 grams of distilled water was added to disperse PU molecules. The PU dispersion, with diameter 75 nm and viscosity 11 cps(25° C.), was obtained. The IR spectra were shown in FIG. 1.

EXAMPLE 1 COMPARISON

The following ingredients are added to a reactor:

50 grams of polytetramethylene glycol (PTMG, the average molecule weight is 2000)

50 grams of polypropylene glycol (PPG, the average molecule weight is 6000)

The nitrogen is added, and agitate for 10 minutes under 80° C., then adding 15.7 grams of 4,4'-dicyclohexylmethane diisocyanate ($H_{12}MDI$) to react under the same temperature for eight hours. After the PU prepolymer has been formed, 8.45 gram of diethyl malonate is added for performing the blocking reaction. After 11 hours, there is 0.5% of N=C=O being remaining unreacted. If the reaction is performed continuously, there is also some remaining N=C=O. When 3 grams of isopropyl alcohol is added to the reaction, after 20 minutes, the N=C=O absorption at 2270 $cm^{-1}$ has disappeared completely.

EXAMPLE 2

(B) Cationic water PU

The following ingredients are added to a reactor:

50 grams of polytetramethylene glycol (PTMG), the average molecule weight is 2000)

20 grams of polypropylene glycol (PPG, the average molecule weight is 6000)

5.9 grams of dimethylolpropionic acid (DMPA)

30 grams of D1

(Wherein $R_1=R_4=H$, $R_2=R_3=CH_2CH_3$, $n_1=30$, $n_2=n_3=1$), and nitrogen is added, then agitated for 20 minutes under 80° C., next adding 41.8 grams of 4,4'-dicyclohexylmethane diisocyanate ($H_{12}MDI$) to react under the same temperature for eight hours. After the PU prepolymer has been formed, 23.1 grams of diethyl malonate is added for performing the blocking reaction for 2.5 hours. After 2.5 hours, the N=C=O absorption at 2270 $cm^{-1}$ has disappeared completely. Then the temperature of the prepolymer is decreased to 40° C. and 4 grams of triethyl amine is added for reacting continuously for 20 minutes. Finally, 500 grams of distilled water were added to afford aqueous PU with diameter 50 nm and viscosity 15 cps.

EXAMPLE 2 COMPARISON

The following ingredients are added to a reactor:

50 grams of polytetramethylene glycol (PTMG, the average molecule weight is 2000)

20 grams of polypropylene glycol (PPG, the average molecule weight is 6000)

30 grams of polyethylene glycol (PEG, the average molecule is 600)

4.6 grams of DMPA

The nitrogen is added, and is agitated for 20 minutes under 80° C., then adding 49.8 grams of 4,4'-dicyclohexylmethane diisocyanate ($H_{12}MDI$) to react under the same temperature for eight hours. After the PU prepolymer has been found, 25.4 gram of diethyl malonate is added for performing the blocking reaction. After 12 hours, there are 0.8% of N=C=O remaining unreacted. 3 grams of isopropyl alcohol are added to the reaction, for 20 minutes. 500 grams of distilled water were added to form water borne PU with diameter 80 nm and Brookfield (25 degree C.) 14 cps.

EXAMPLE 3

C) Anionic water PU

The following ingredients are added to a reactor:

50 grams of polytetramethylene glycol (PTMG, the average molecule weight is 2000)

20 grams of polypropylene glycol (PPG, the average molecule weight is 6000)

20 grams of polyethylene glycol (the average molecule is 1000)

6.5 grams of N-methyl-2,2-iminodiethanol 10 grams of D1

(Wherein $R_1=R_4=H$, $R_2=R_3=CH_2CH_3$, $n_1=30$, $n_2=n_3=1$).

The nitrogen is added, and agitate, for 10 minutes at 80° C. 23.1 grams of diethyl malonate is added to the reaction for 2.5 hours. After 2.5 hours, the absorption at 2270 $cm^{-1}$ has disappeared completely from the infrared spectrum. Then the temperature is decreased to 40 degrees C. and 5.6 grams of methyl sulfonic acid is added for reacting continuously for 10 minutes. Finally, 500 grams of distilled water were added to afford aqueous PU with a diameter of 80 nm and a Brookfield viscosity of 11 cps.

EXAMPLE 3 COMPARISON

The following ingredients are added to a reactor:

50 grams of polytetramethylene glycol (PTMG, the average molecule weight is 2000)

30 grams of polypropylene glycol (PPG, the average molecule weight is 6000)

20 grams of polyethylene glycol (PEG, the average molecule is 600)

10 grams of $D_2$ (Wherein $R_3=CH_2CH_3$, $R_4=CH_3$, $n_1=35$, $n_4=3$). The nitrogen is added, and is agitated for 20 minutes under 80° C., then adding 27.9 grams of 4,4'-dicyclohexylmethane diisocyanate ($H_{12}MDI$) to react at the same temperature for eight hours. Next 15.33 gram of diethyl malonate is added for reaction for 1.5 hours. The N=C=O absorption at 2270 $cm^{-1}$ has disappeared completely from the infrared spectrum. Finally, 500 grams of distilled water were added to give aqueous PU with a diameter of 115 nm and a Brookfield viscosity of 17 cps.

From the aforementioned description, the improved reaction of water PU resins of the present invention is new, and it is known from the experiment that the blocking reactions of beta-dicarbonyl compounds and the polyisocyanates can indeed reduce the reaction time and side reactions are avoided completely.

It should be understood that the embodiments described here are exemplary and that a person skilled in the art may make any variation and modification without departing from the spirit and scope of the present invention. All such modifications are intended to be included within the scope of the invention as defined in the appended Claims.

What is claimed is:

1. An improved method for forming polyurethane resins from beta-dicarbonyl blocked polyisocyanates wherein the blocked polyisoyantes comprise $D_1$ or $D_2$ to reduce the blocking reaction time to 1–3 hours, wherein $D_1$ and $D_2$ have the structures:

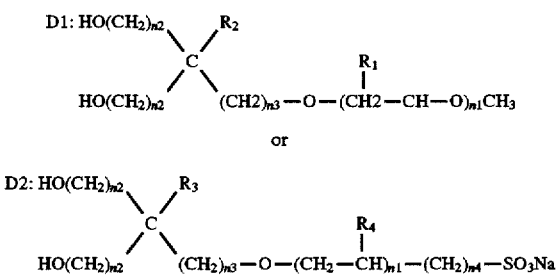

wherein:

$R_1$, $R_2$, $R_3$, $R_4$ = hydrogen or alkyl group $n_1 = 1-100$ $n_2$, $n_3$, $n_4 = 1-10$.

2. The improved method for forming polyurethane resins as recited in claim 1, wherein the amount of $D_1$ and $D_2$ added is within the range of 0.1%–80% of the weight of said polyisocyanates.

3. The improved method for forming polyurethane resins as recited in claim 1, wherein the beta-dicarbonyl compounds comprises malonic ester, acetoacetic acid alkyl ester and acetylacetone.

4. The improved method for forming polyurethane resins as recited in claim 1, wherein said polyisocyanates are derived from polyester polyol, polycarbonate polyol, polyether polyol, and combination thereof.

5. The improved method for forming polyurethane resins as recited in claim 1, wherein the isocyanates used are aromatic compounds, aliphatic compounds, alicyclic compounds, and others which are the combination thereof.

6. The improved method for forming polyurethane resins as recited in claim 1, wherein the NCO/OH ratio selected is within the range of 1.0–2.0.

* * * * *